United States Patent [19]
Kreft

[11] Patent Number: 5,473,323
[45] Date of Patent: Dec. 5, 1995

[54] APPARATUS FOR CONTACTLESS ENERGY AND DATA TRANSMISSION FOR SINGLE COIL AND TWO-COIL SYSTEMS

[75] Inventor: Hans-Diedrich Kreft, Dassendorf, Germany

[73] Assignee: Angewandte Digital Electronik GmbH, Dassendorf, Germany

[21] Appl. No.: 160,347

[22] Filed: Nov. 30, 1993

[30] Foreign Application Priority Data

Nov. 30, 1992 [DE] Germany .................. 42 40 238.7

[51] Int. Cl.$^6$ ................................ G08C 17/00
[52] U.S. Cl. ............... 340/870.31; 340/870.32; 340/870.18; 340/870.25; 340/825.54; 455/41; 455/42; 455/60; 235/380
[58] Field of Search .......... 340/870.31, 870.3, 340/870.32, 825.34, 825.54, 825.7, 870.18, 870.25; 455/41, 42, 60; 235/380; 342/44, 51

[56] References Cited

U.S. PATENT DOCUMENTS

| | | | |
|---|---|---|---|
| 4,697,183 | 9/1987 | Jenning et al. | 340/870.25 |
| 4,796,028 | 1/1989 | Mackenthun et al. | 340/825.58 |
| 4,818,855 | 4/1989 | Mongeon et al. | 235/440 |
| 4,857,893 | 8/1989 | Carroll | 340/572 |
| 5,329,274 | 7/1994 | Donig et al. | 340/825.34 |

FOREIGN PATENT DOCUMENTS

| | | |
|---|---|---|
| 0309201 | 3/1989 | European Pat. Off. . |
| 62-297988 | 12/1987 | Japan . |

OTHER PUBLICATIONS

Imjela; "C2–Card (Contactless Chipcard)," Valvo Philips Bauelemente, Laboratory Report HTV 8902 of Oct. 11, 1989, pp. 1–30, published Jan. 1990.

*Primary Examiner*—John K. Peng
*Assistant Examiner*—Andrew Hill
*Attorney, Agent, or Firm*—Hill, Steadman & Simpson

[57] ABSTRACT

An inductor transmission path for energy and data from a write/read station onto, for example, a chip card is disclosed. A specific, vector-oriented phase modulation with two coils is disclosed, making it possible for the write/read station to use the same method to service different cards, i.e. those with one coil, or with a large coil or having two coils.

9 Claims, 7 Drawing Sheets

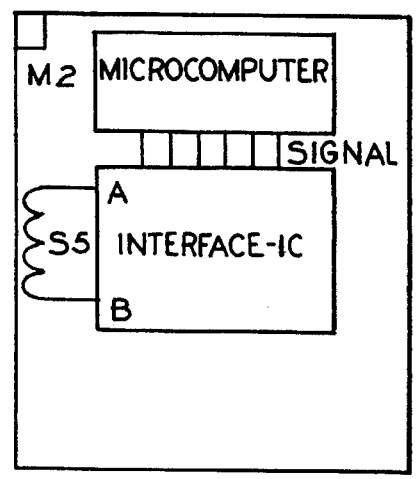
FIG. 1b
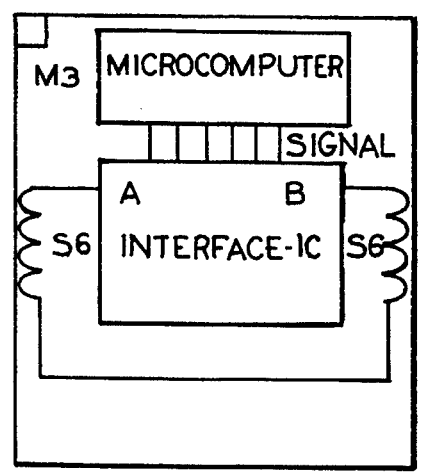
FIG. 1c
FIG. 1d
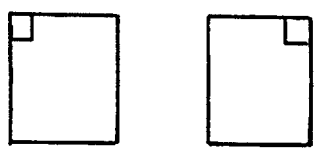
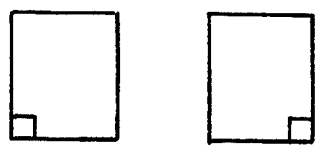

$X_n' \triangleq t1; X_n'' \triangleq t2; X_n''' \triangleq t3; t1 < t2 < t3$ $Xn' \triangleq t1; Xn'' \triangleq t2; Xn''' \triangleq t3; t1 < t2 < t3$ 5,473,323

APPARATUS FOR CONTACTLESS ENERGY AND DATA TRANSMISSION FOR SINGLE COIL AND TWO-COIL SYSTEMS

BACKGROUND OF THE INVENTION

1. Field of the Invention

The invention is directed generally to an apparatus for contactless energy and data transmission, having an immobile part (microstation) and a mobile part (microunit), for example a read/write station and a chip card.

2. Description of Prior Art

An apparatus for contactless energy and data transmission for a microstation and microunit employed in contactless chip cards or other data carriers such as electronic keys and modules is disclosed by German reference DE 34 47 560 C2, which was the priority basis for U.S. Pat. No. 4,697,183 issued to assignee herein. This reference discloses a two-coil transformer apparatus for a microstation that has bidirectional data transmission by 180° phase modulation of one of the phases, linked with an amplitude modulation. German reference DE 34 47 560 C2 further discloses the apparatus of the microunit which works similarly with two transformer coils. German reference DE 36 14 477 C2, which was the priority basis for U.S. Pat. No. 4,796,028 issued to assignee herein, further discloses contactless energy and data transmission which requires only one transformer coil in the microstation and one in the microunit, and data recovery in this microunit is more complicated than that in German reference DE 34 47 560 C2. An additional capability of a microunit, similar to that disclosed in German reference DE 36 14 477 C2, is that it can also be operated at an increased distance from a microstation by using a large format coil in the microunit.

A common problem of existing card readers is that faults are caused by improper insertion of the card into the card reader. A card reader is needed for providing fault-free, contactless data transmission when the card is in a multitude of orientations.

SUMMARY OF THE INVENTION

It is an object of the present invention to provide an apparatus for contactless energy and data transmission between a microunit and a microstation for three possible coil arrangements set forth herein.

It is an object of the invention to provide an apparatus having a microunit that is able to receive energy as well as transmit data independently of its spatial position with respect to a microstation. The microunit can thus be inserted in a multitude of orientations and still provide for faultless data transmission. In addition, the data reception of the microunit must also function during times when data are being transmitted from the microunits to the microstation.

It is also an object to provide an apparatus wherein data reception functions independently of the electrical load of the circuits on the microunit. It is critical that amplitude fluctuations due to the change of the transformer path or due to temperature or other influences have no influence on the signal transmission. The different types of formatting and data evaluation in the microunits must be compatible with the microstation.

It is a further object of the invention to solve a special problem presented by faultless signal transmission from two coils in a microstation M4 to one coil in a microunit M3. Since a coherently-generated transmission oscillation having identical frequency and different amplitudes emanates from two spatially separated coils (S1, S2) and is received by one coil (S6), canceling superpositions can occur. Thus, the reception side would receive no induced voltages or slight induced voltages. As a result, the continuous signal transmission would not be assured. It is an object of the present invention to avoid this problem by limiting the phase difference between the spatially separate oscillations.

The above objects are inventively achieved in a method and apparatus for contactless data and energy transmission between an immobile microstation having a coil pair and further having a means for providing an oscillating clock signal and a mobile microunit having one or two coils, having the following steps: a) generating a first and a second synchronous oscillation signal having the same frequency and phase-shifted by 90° relative to each other by a phase modulator in the microstation; b) assigning every phase switching of the oscillating signals to a logical signal level "high" or "low" of a data signal fed into the phase modulator; c) switching the phase-shifted oscillations by |90°| by the phase modulator in a defined fashion depending on the data signal to be transmitted to the microunits, such that the phases of the oscillations do not oppositely cross during the switching and also do not become equiphase; d) controlling a first amplifier and a first transformer coil by the first oscillating signal and controlling a second amplifier and a second transformer coil by the second oscillating signal, so that the transformer coils generate respective first and second magnetic energy field signals having phase modulated information, and further coupling the magnetic energy fields onto the coils of the microunits to transmit the information; and e) transmitting data from the microunits to the microstation by amplitude modulation caused by a load change at the coil or coils of the microunits, whereby the load change can be identified at at least one coil of the microstation; f) summing the first and second signals to form a summation signal; g) demodulating the summation signal by amplitude demodulation; and h) outputting a logical digital data signal level.

BRIEF DESCRIPTION OF THE DRAWINGS

The invention shall be set forth in greater detail below with reference to the drawings.

FIG. 1b is a block circuit diagram of an exemplary microunit of the present invention having one reception coil.

FIG. 1c is a block circuit diagram of an exemplary microunit of the present invention having a large reception coil.

FIG. 1d shows arbitrary operating orientations of an exemplary microunit of the present invention.

DESCRIPTION OF THE PREFERRED EMBODIMENT

Figure 1A:
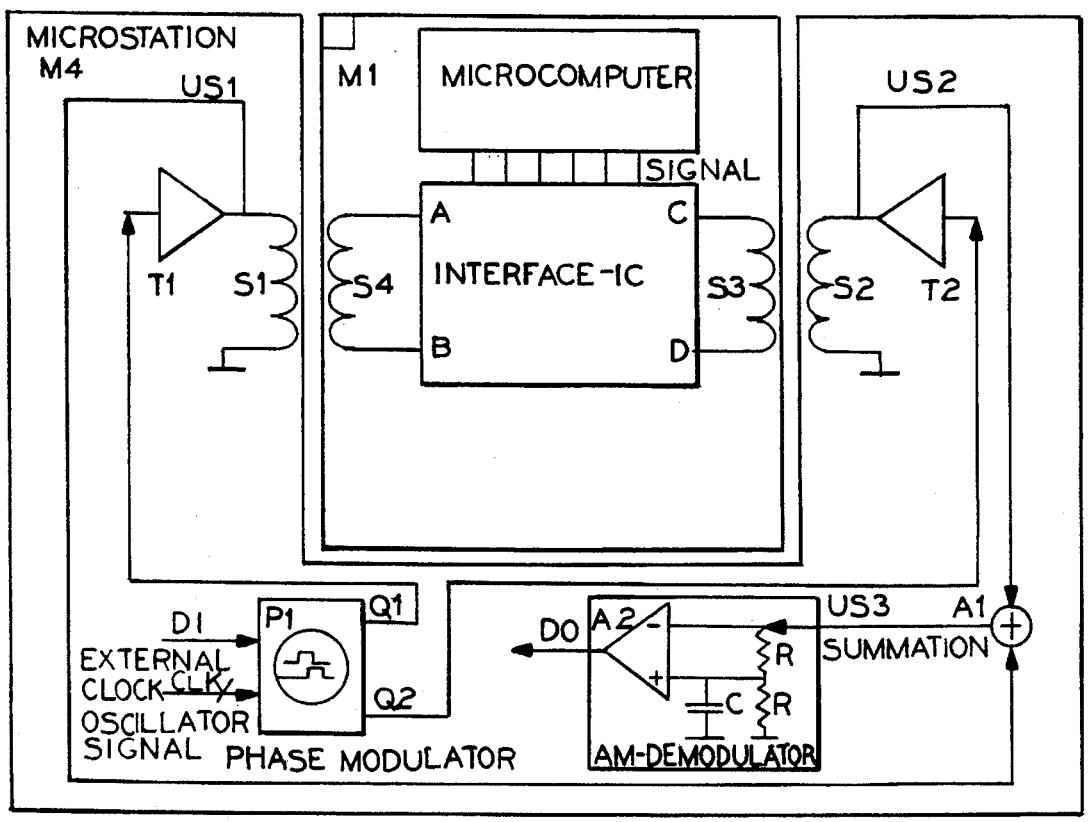
FIG. 1a is a block circuit diagram of the microstation and of an exemplary microunit of the present invention having two reception coils.
Figure 1E:
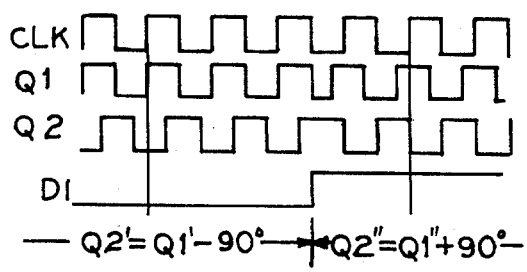
FIG. 1e shows data transmission diagrams to a microunit of the present invention.
Figure 1F:
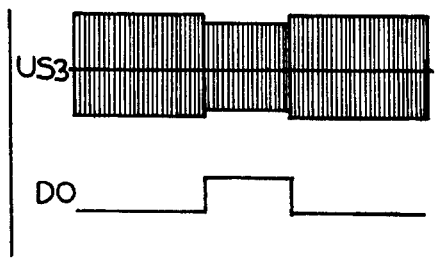
FIG. 1f shows data reception diagrams from the microunit of the present invention.

FIG. 1a shows the microstation M4 as well as microunit M1. The alternative microunits M2 and M3 of the present invention are shown in FIGS. 1b and 1c. The following is a description of the block circuit diagram of FIG. 1a.

A square-wave oscillation clock signal, CLK, externally supplied in the microstation or self-generated internally is forwarded to a phase modulator P1 which generates two oscillations Q1 and Q2 at the output of P1 that are synchronous with CLK; Q1 and Q2 are produced phase-shifted relative to one another. It is thus assured that these electromagnetic waves are a coherent wave train of identical frequency, which is also preserved given a spatial, contactless, wireless transmission. The phase shift of Q1 and Q2 amounts to approximately |90°|, where Q1 leads Q2. The incoming digital data signal D1, which transmits to the microunit, modifies the phase relation of Q1 and Q2 by |90°| each dependent on its low or high signal level. The phase direction change of each and every signal is thereby of critical significance. This shall be set forth later with reference to FIG. 2. The signals Q1, Q2 are forwarded via the amplifiers T1, T2 to the coils S1, S2 which are coupled to the coils S3, S4 of the microunit M1 in a contactless fashion. Alternatively to the microunit M1, the microunits M2 or M3 can also be coupled to the microstation M4. Microstation M2 couples with only one coil S5 to S1 or S2 and microstation M3 couples with one large coil S6 to S1 and S2. Each alternative microunit (M1, M2 and M3) also has a microcomputer with memory and signal connections to an interface IC, as shown.

As symbolically shown in FIG. 1d, the microunits are functional in the illustrated positions, since at least one coil of the microunits energetically couples with one of the coils in the microstation. The microunit could thus be used in four different spatial positions (two positions per planar rotation and two positions per spatial rotation) in relationship to the microstation. This is advantageous when the microunit has data carriers such as chip cards (bank cards, credit cards).

The microunits effect a data transmission to the microstation by defined amplitude modulation, caused by load modification, of at least one of the signals US1, US2 of the coils S1, S2. US1, US2 are decoupled in summation and brought together so that the amplitude modulation of the two signals at US3 is demodulated in the amplitude demodulator A2 to form a digital signal output, DO.

Figure 2:
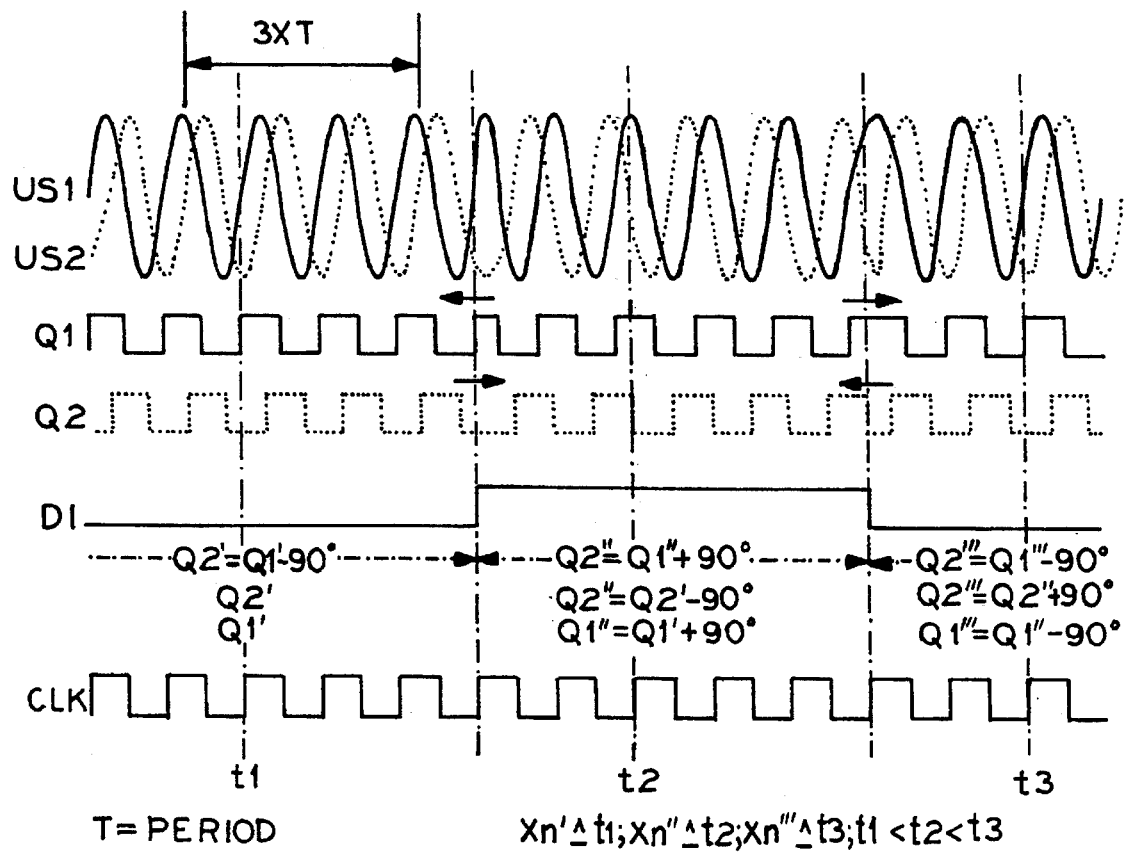
FIG. 2 shows signal curves for the data transmission from the microstation to the microunit by phase switching of the present invention.
Figure 3:
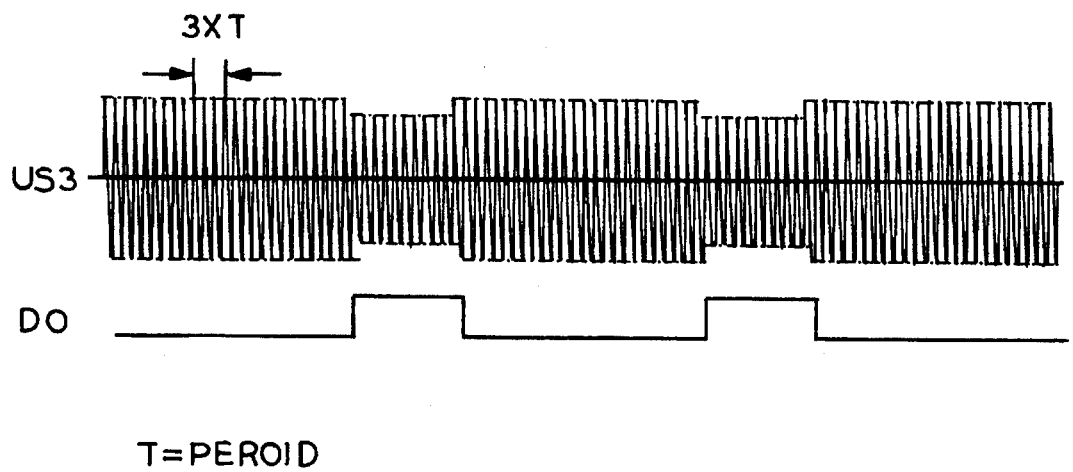
FIG. 3 shows signal curves for the data transmission from the microunit to the microstation of the present invention.

FIG. 3 describes the typical signal curve of the amplitude modulation in the microstation. The data signal can be seen in the envelope; every transmitted data bit causes an amplitude glitch over a plurality of oscillatory cycles. DO is the data following the AM demodulator. The indicated period duration 3×T of the oscillation is only intended to indicate a relation of the chronological conditions as selected between the signal illustrations in FIG. 3 and FIG. 2.

FIG. 2 shows a signal sequence for the phase modulation in the microunit whereby data can be transmitted from the microstation to an arbitrary microunit. The change in phase direction is of critical significance in the present invention.

In the modulation shown, for simplicity, (') is used as a designator in order to identify different time intervals, where (') means a chronologically earlier event than (''), and ('') means a chronologically earlier event than ('').

Figure 7:
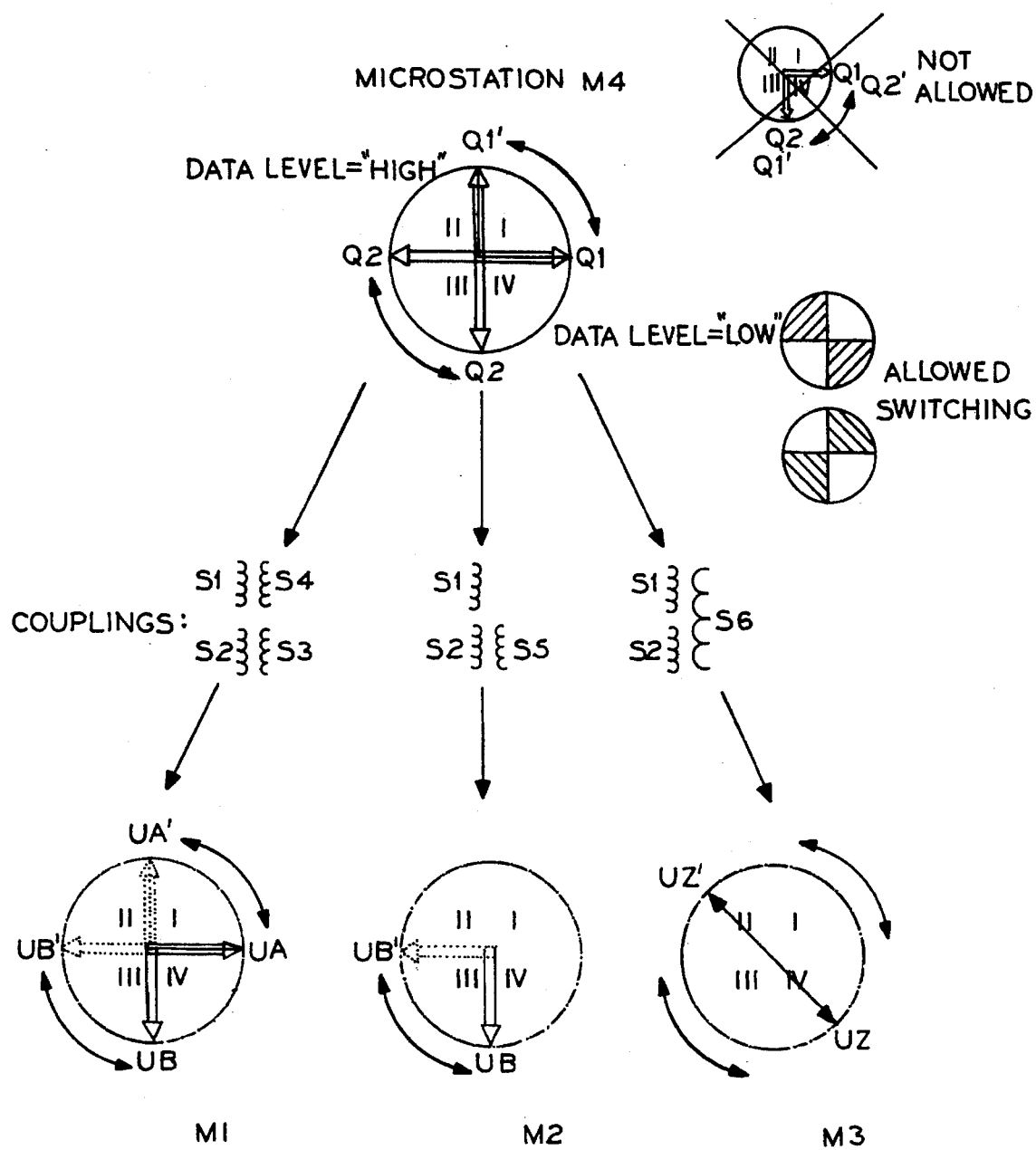
FIG. 7 shows a locus curve illustration for pulse illustrations of the angle functions for the phase relations of the data transmission to the microunits of the present invention.

Q1 is |90°| phase-shifted and leading Q2. The data signal D1 modifies the phases of both Q1 and Q2 by |90°| each in the phase modulator depending on its position, high or low. The phase direction change of each of the signals occurs such that the phases of the oscillations Q1, Q2 do not oppositely cross during the switching and also do not become equiphase. The directional arrows indicate how each phase shifts given each data signal change of D1. For this specific example of signals, the phase modulator P1 prevents the phase change from proceeding, as shown in FIG. 2 with inverse directional arrows. This procedure becomes clearer in the locus curve illustration of FIG. 7. FIG. 7 shows the locus curves of the signal phases for the digital signal presentation of the microstation and the three possible microunits. The coupling paths are again symbolically indicated for the individual microstations.

The modulation in the microstation follows the following regularity:

Q1 and Q2 each modulate by ±90°;

Q1 switches only in quadrant I, whereas Q2 modulates only in the opposite quadrant III;

Q1 and Q2 never cross with the same phase relation;

The phase difference between Q1 and Q2 is always 90° before and after every switching.

As long as the modulation of Q1 and Q2 occurs in respective, diagonally-opposite quadrants (I and III or II and IV), the output position in the quadrants can be freely determined. In no way whatsoever—as shown in FIG. 7—is the modulation of Q1 and Q2 in the same quadrant allowed, since this makes a phase evaluation in the microunit M3 impossible.

Figure 4A:
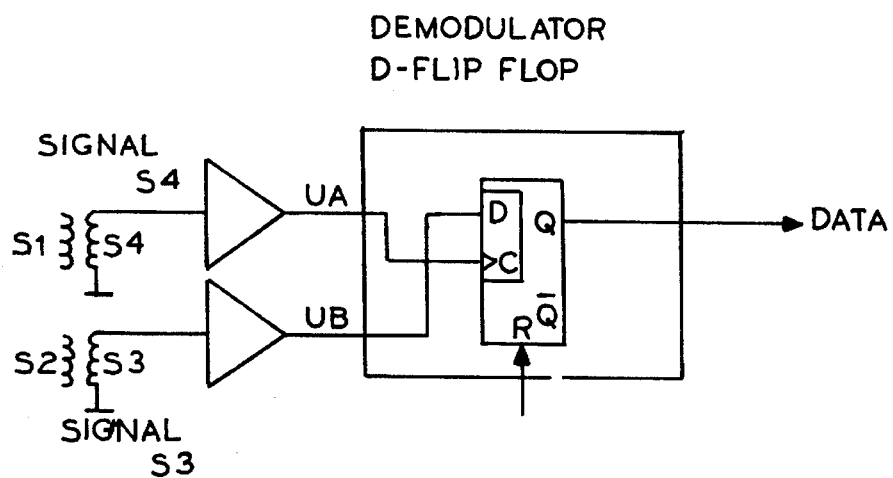
FIG. 4(a–b) shows phase evaluation and data recovery for a two-coil microunit (M1), which infeeds from two transformer coils of the microstation of the present invention.

FIGS. 4a, b, 5a, b and 6a, b serve the purpose of illustrating the individual phase evaluations for the alternate microunits of the invention. Each is described below in more detail.

Figure 4B:
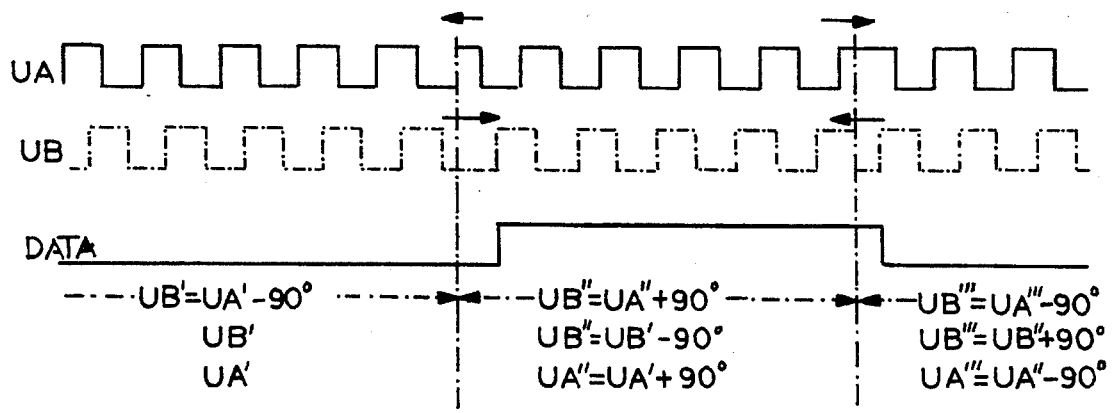

The microunit M1 (FIG. 1a) with its signals illustrated in FIG. 4b, receives two oscillations from S1, S2 via the coil pair S3, S4. Following the level converters, which digitally match the analog signals, the phase-shifted signals UA and UB are forwarded to a data flip-flop. As a result, the modulation of the phases can occur digitally in a simple way. The evaluation occurs in conformity with German reference DE 34 47 560 C2.

Figure 5A:
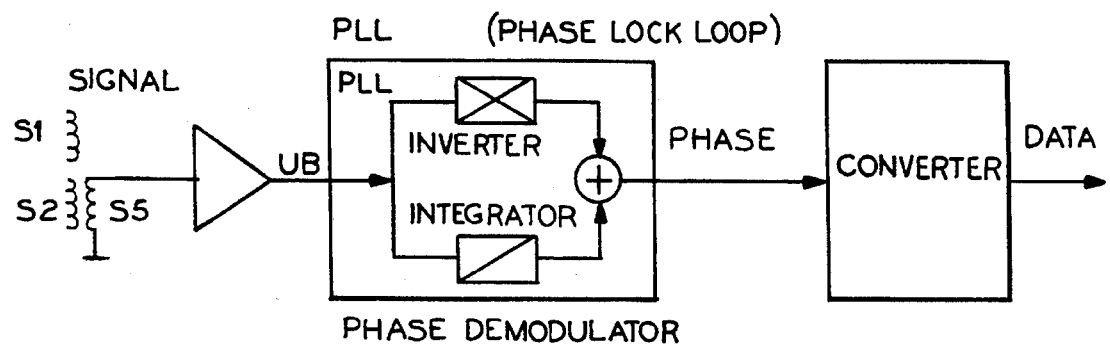
FIG. 5(a–b) shows phase evaluation and data recovery for a single-coil microunit (M2), which infeeds from one of two transformer coils of the microstation of the present invention.
Figure 5B:
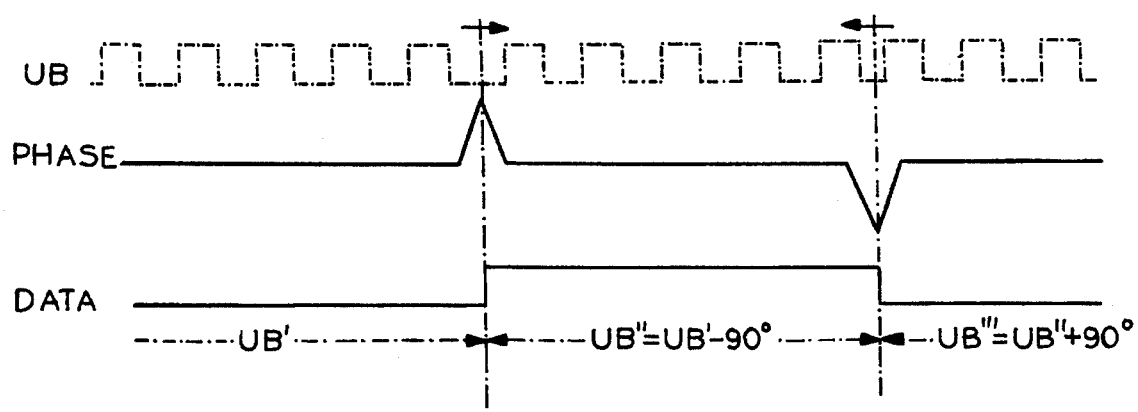

The microunit M2 (FIG. 1b), with its signals shown in FIG. 5b, receives an oscillation from S1 or S2 via the coil S5, which is dependent on the position of the microunit. Following the level converter, the digital signal UB is evaluated in the phase demodulator. Since only one signal without a reference signal is available, the evaluation can occur, for example, with a PLL (phase-locked loop) that forms a mean value of the incoming frequency and phase of UB as a reference. Every brief-duration change of the phase due to data can thus be detected. According to German reference DE 36 14 477 C2, an evaluation with a pulse generator is also possible by identifying the times of the periods of UB and comparing them to a mean value. Details may be derived from German reference DE 36 14 477 C2. The phase demodulator in FIG. 5a thus recognizes a 90° phase change and outputs this as an analog value, but only during the times wherein the phase changes. A following converter generates a digital data signal, DATA, from the analog signal.

Figure 6A:
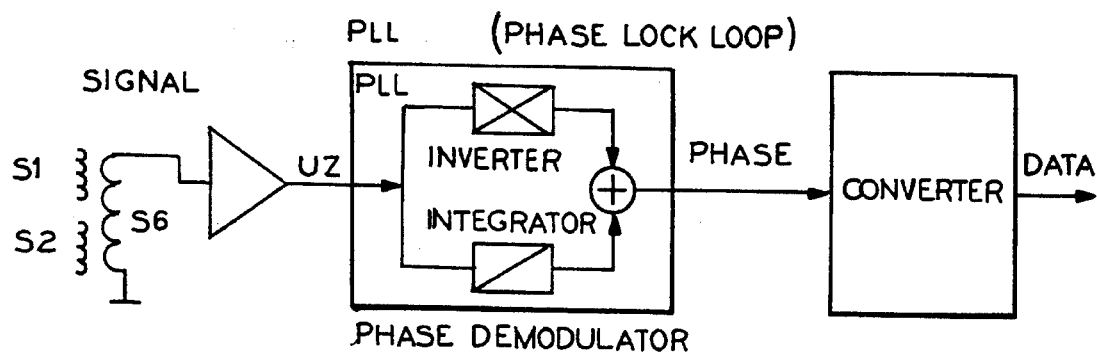
FIG. 6(a–b) shows phase evaluation and data recovery for a large, single-coil microunit (M3), which infeeds from both of two transformer coils of the microstation of the present invention.
Figure 6B:
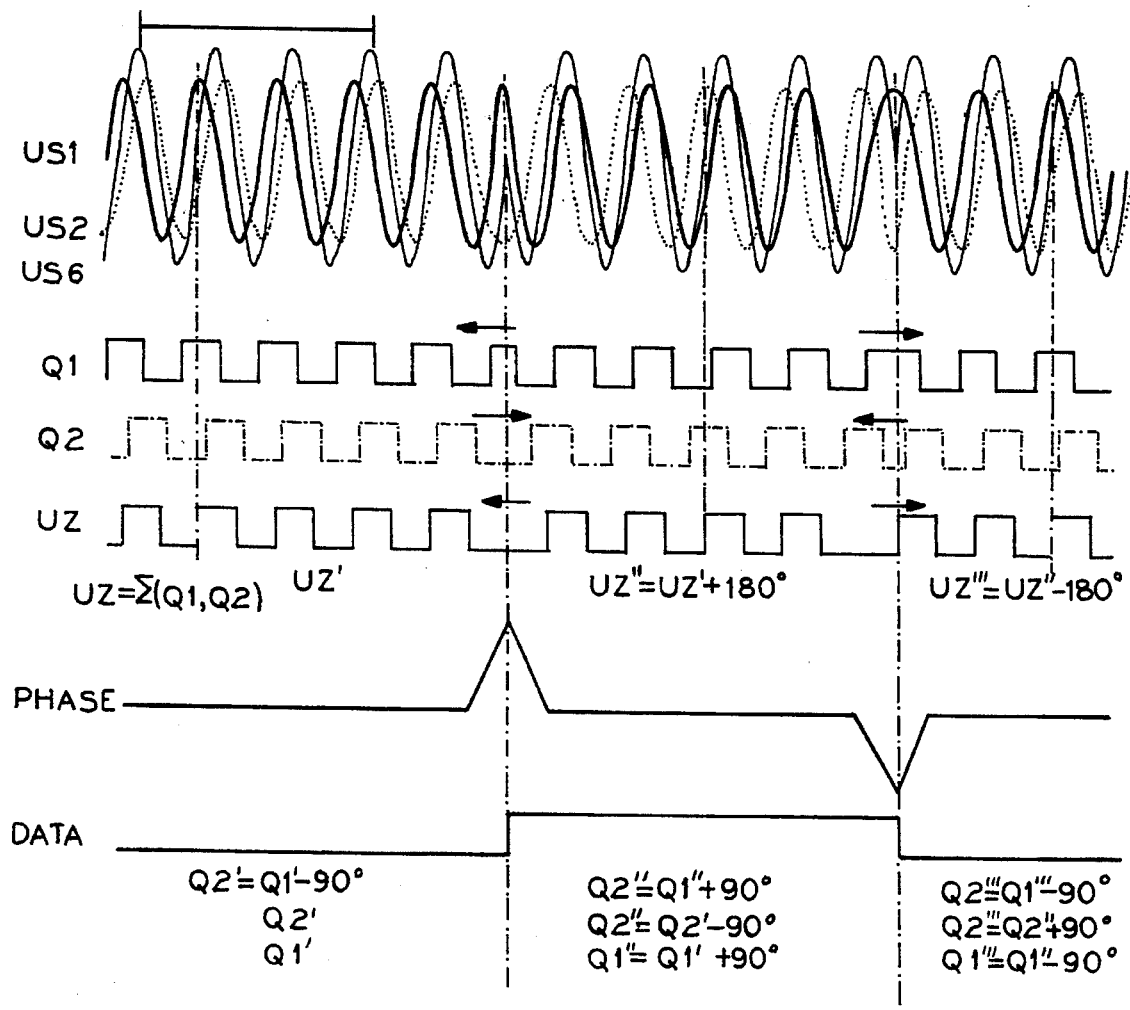

The microunit M3 (FIG. 1c), with its signals illustrated in FIG. 6b, receives the two oscillations from S1 and S2 via only one coil S6. A new oscillation at S6 that is phase-shifted by approximately 45° between the phases of the oscillations of S1, S2 results therefrom. The modulation of Q1 and Q2 in the respective quadrants of the locus curve lying opposite one another assures that the new oscillation at S6 experiences a phase change. The phase change is ±180°. If, by contrast, the phase modulation were to switch the phases in the same quadrant, then the oscillation at S6 could not experience any phase change and a data evaluation would thus be impossible. The phase demodulation happens in the same way as in the structure of microunit M2. Following the level converter, UZ drives the phase demodulator which yields a greater analog value at the output than in the case of M2, since the phase change amounts to ±180°. The converter converts the output signal of the demodulator "phase change" into the digital signal, DATA. The defined, direction-oriented switching of the phases Q1 and Q2 in the respective quadrants of the locus curve lying diagonally opposite one another is only required for the data evaluation in microunit M3, so that a phase change can be produced at S6. Given a switching of the phases of Q1 and Q2 in the same quadrant, shown crossed out in FIG. 7, a data transmission to microunit M3 is only possible if both frequencies of the signals Q1 and Q2 were to be additionally, identically modulated. The PLL demodulator remains unmodified but evaluates a frequency modulation. The addition of the fields at S6 remains unmodified as long as both modulating frequencies have a phase shift of 90°.

The locus curves of the phase curves for the individual microunits are shown again in the lower part of FIG. 7. The broken-line (interrupted) arrows thereby respectively indicate the switching condition.

Although other modifications and changes may be suggested by those skilled in the art, it is the intention of the inventor to embody within the patent warranted hereon all changes and modifications as reasonably and properly come within the scope of his contribution to the art.

I claim:

1. A method for contactless data and energy transmission between an immobile microstation having a coil pair and further having a means for providing an oscillating clock signal and a mobile microunit having either one or two coils, comprising the following steps:

a) receiving the clock signal by a phase modulator in the microstation and generating from the clock signal, a first and a second synchronous oscillating signals having the same frequency and phase-shifted by 90° relative to each other by the phase modulator in said microstation;

b) assigning every phase switching of the synchronous oscillating signals to a logical signal level "high" or "low" of a data signal to be received by the phase modulator and transmitted to a microunit;

c) switching said phase-shifted synchronous oscillating signals by |90°| by said phase modulator in a defined fashion depending on said data signal to be transmitted to a microunit, such that the phases of said synchronous oscillating signals do not oppositely cross during said switching and also do not become equiphase;

d) controlling a first amplifier and a first transformer coil of said coil pair on the microstation by said first synchronous oscillating signal and controlling a second amplifier and a second transformer coil of said coil pair on the microstation by said second synchronous oscillating signal so that said transformer coils generate respective first and second magnetic energy field signals having phase modulated information, and further coupling said magnetic energy field signals onto the either one or two coils of the microunit;

e) demodulating the phase modulated data and outputting data in the microunit;

f) transmitting data from said mobile microunit to said microstation by utilizing amplitude modulation caused by a load change at said one or two coils of said microunit, whereby said load change of said one or two coils of the mobile microunit can be identified by the amplitude modulation induced in the signal at the coupled one or both coils of said microstation;

g) summing with respect to time, the first and second signals of the two coils of the microstation to form a summation signal;

h) demodulating said summation signal by amplitude demodulation; and i) outputting a logical digital data signal level.

2. The method of claim 1, wherein said coupling step is further defined by coupling a microunit having one coil onto one of said coils of said microstation.

3. The method of claim 1, wherein said coupling step is further defined by coupling a microunit having two geometrically separated reception coils onto both coils of the coil pair of said microstation to form two separate pairs of coupled coils.

4. The method of claim 1, wherein said coupling step is further defined by coupling a microunit having one large coil onto both of said coils of said microstation simultaneously, so that a canceling superposition of the induced voltage in said large coil is reduced by a limited phase difference between said transmitted synchronous oscillating signals.

5. The method of claim 1, further defined by enabling said data transmission from said microunit and from said microstation while having an arbitrary spatial operating position of said microunit relative to said microstation during demodulating the phase and/or amplitude modulated signal.

6. An apparatus for contactless data and energy transmission including, a mobile microunit having either one or two coils and further comprising:
   means for receiving and demodulating a phase modulated information signal and outputting data;
   means for sending data by load modulation of the one or two coils of the microunit;

an immobile microstation having a coil pair and a means for providing an oscillating clock signal utilized for generating a first and a second synchronous oscillating signals of equal frequency and phase-shifted by 90° from each other, so that data transmission from microstation to microunit occurs by switching the phase-shifting of the first and second synchronous oscillating signals, said microstation further comprising:
   data signal providing means for providing a data signal to be transmitted to a microunit;
   phase modulator means for generating the first and second synchronous oscillating signals from the clock signal and for switching the phase of the two synchronous oscillating signals by |90°| depending on a logic level of said data signal, such that the phases of said oscillations do not oppositely cross during the switching and also do not become equiphase;

first amplifier means having an input coupled to receive said first synchronous oscillating signal and an output coupled to a first transformer coil of said coil pair of said microstation for generating a first magnetic energy field signal and for transmitting a phase modulated information signal;

second amplifier means having an input coupled to receive said second synchronous oscillating signal and an output coupled to a second transformer coil of said coil pair of said microstation for generating a second magnetic energy field signal and for transmitting a phase modulated information signal;

means for coupling said first and second magnetic energy field signals thereby transmitting phase modulated information onto said one or two coils of the microunit;

means for summing with respect to time, the first and second signals of the two coils of the microstation to form a summation signal; and amplitude demodulator means for demodulating said summation signal and outputting data transmitted by the microunit, resulting from a load change at said one or two coils of said microunit, from said microunit to said microstation.

7. The apparatus of claim 6, wherein said microunit has two geometrically separated coils for coupling with the pair of said coils of said microstation to form two separate pairs of coupled coils whereby said coupling of said pairs is arbitrary.

8. The apparatus of claim 6, wherein said microunit has one coil for coupling onto one of said microstation coils whereby said coupling is arbitrary.

9. The apparatus of claim 6, wherein said microunit has one large coil for simultaneously coupling onto both of said microstation coils, whereby a canceling superposition of the induced voltage in said one large coil is reduced by a limited phase difference between said transmitted synchronous oscillating signals.

* * * * *